(12) United States Patent
Clark et al.

(10) Patent No.: US 7,354,003 B1
(45) Date of Patent: Apr. 8, 2008

(54) CARD READER

(75) Inventors: Barrie Clark, Dundee (GB); Stuart W. Masterton, Newtyle (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/521,713

(22) Filed: Sep. 15, 2006

(51) Int. Cl.
*G06K 13/00* (2006.01)

(52) U.S. Cl. ....................................... 235/475

(58) Field of Classification Search ................. 235/475
See application file for complete search history.

(56) References Cited

U.S. PATENT DOCUMENTS

| | | | | |
|---|---|---|---|---|
| 5,850,079 | A * | 12/1998 | Ohwa et al. ................. | 235/475 |
| 5,929,413 | A * | 7/1999 | Gardner ....................... | 235/379 |
| 6,196,463 | B1 * | 3/2001 | Ferry ........................... | 235/475 |
| 6,491,216 | B1 * | 12/2002 | May ............................. | 235/375 |
| 6,588,659 | B2 * | 7/2003 | May ............................. | 235/380 |
| 6,923,372 | B2 * | 8/2005 | Hirasawa et al. ............ | 235/449 |
| 7,143,934 | B2 | 12/2006 | Ghisani | |
| 2004/0089723 | A1 * | 5/2004 | Moriya ........................ | 235/475 |

FOREIGN PATENT DOCUMENTS

FR        2 554 262 A1    3/1985

* cited by examiner

*Primary Examiner*—Michael G. Lee
*Assistant Examiner*—Tuyen Kim Vo
(74) *Attorney, Agent, or Firm*—Michael Chan

(57) ABSTRACT

A card reader comprises a mouth region for receiving a card having stored data to be read and a data reader region for reading the stored data. The reader is arranged to deliver a card received at the mouth region to the data reader region via a delivery path. The delivery path is arranged to maintain the card in a predetermined plane during transportation. A signal source is arranged to produce an output signal which is projected across the delivery path in the plane which a card passes when in use. A detector is also arranged to receive the output signal and to detect the presence of an object in the delivery path in response to the object interfering with the output signal.

14 Claims, 4 Drawing Sheets

CARD READER

TECHNICAL FIELD

The present invention relates to a card reader for receiving a magnetic stripe or smart card carrying stored data for the subsequent reading of the said data and, relates particularly, but not exclusively, to a card reader such as that employed in an Automated Teller Machine (ATM).

BACKGROUND

Self-service financial terminals such as ATMs are commonly arranged to receive a card having magnetically stored data which can be employed to verify the identity of an individual accessing the self-service terminal. However, the requirement for using such a card does not prevent attempted fraud or other erroneous, or inappropriate, operation of the self-service terminal.

On the contrary ATMs and other self-service terminals provide opportunities for criminals to defraud customers and financial institutions by intercepting magnetic card and/or PIN information.

In recent years, it has been sufficient to merely acquire magnetic information from a card, offered to an ATM, by reading the magnetic stripe as the card enters or leaves the magnetic reader—a process known as "card skimming". However, in order to eliminate such fraud, financial institutions worldwide are introducing "chip and PIN" cards. These are smart cards which cannot currently be easily copied, so criminals will inevitably move towards card capture. One known means of card capture from an ATM is a, so called, "Lebanese Loop", which is a device which incorporates a filament of material, in the form of a loop, to constrain and thereby capture a card within the ATM card reader and prevent its return to the authorized user. The loop may be made from any strong flexible material from video tape to dental floss.

To-date, various defenses against such attacks have been attempted. Some approaches to this problem, such as the Applicants' earlier U.S. Patent, U.S. Pat. No. 6,196,463, attempt to detect the presence of a Lebanese Loop by electro-mechanical means which are inherently unreliable.

In U.S. Pat. No. 6,196,463 a beam is projected from a source on a moving buggy which is swept across the complete width of the transport path, thus allowing the beam to be projected at the transport path across its entire width. Detecting means are arranged to receive an output signal and to detect the presence of an object in the path in response to the object interfering with the signal. However, the mechanical complexity of this solution renders it costly and unsatisfactory to ATM manufacturers.

SUMMARY

The present invention seeks to provide for a card reader such as the type that might be employed in a self-service terminal and which exhibits advantages over known card readers in reducing the likelihood of fraudulent operation of the terminal.

According to a first aspect of the present invention there is provided a card reader comprising a card receiving means for receiving a card having stored data to be read and card reading means for reading the stored data, the reader being arranged to deliver a card received at the card receiving means to the card reading means via a delivery path, the delivery path being arranged to maintain the card in a predetermined plane during transportation, a signal source for providing an output signal which is projected across the delivery path in the plane which a card passes when in use, and detecting means arranged to receive the said output signal and to detect the presence of an object in the path in response to the object interfering with the signal.

In one embodiment the signal source and the detector are located on opposite sides of the delivery path.

In an alternative embodiment both the signal source and the detector are located on the same side of the delivery path and a reflecting means is employed in order to reflect the signal from the signal source for receipt by the detector.

In yet another embodiment, optical fibres are arranged to bring the beam from a remotely located emitter to one side of the path for projection across the path.

Furthermore optical fibres can be arranged at a side of the transport path to receive the beam having crossed the transport path and to transmit the received beam to a remotely located receiver.

A particularly compact arrangement can be achieved in this manner.

The invention is advantageous in that any fraud that might involve the insertion of objects other than the card to be read into the card reader of the self-service terminal can be readily identified irrespective of the shape, configuration and/or dimensions of the object. Thus, a variety of attempted frauds involving the insertion of a "foreign" object, such as a Lebanese Loop, into the card reader can be prevented.

One example of such a signal source comprises a laser.

Preferably, the card reader further comprises an encoding system arranged to provide the beam or beams with a unique signature.

According to a further aspect of the present invention there is provided self-service terminal comprising processor means, card receiving means, card reading means, data input means, display means, output means and connection means for connecting to a central authorization unit, the terminal being arranged to deliver a card received at the card receiving means to the card reading means via a delivery path, the delivery path being arranged to maintain the card in a predetermined plane during transportation, a signal source for providing an output signal which is projected across the delivery path in the plane which a card passes when in use, and detecting means arranged to receive the said output signal and serving to detect the presence of an object in the path in response to the object interfering with the signal.

It should be appreciated that the present invention is particularly advantageous in detecting an object such as a thin or fine member in the form of a thread.

BRIEF DESCRIPTION OF THE DRAWINGS

The invention is described further hereinafter, by way of example only, with reference to the accompanying drawings in which.

DETAILED DESCRIPTION

Figure 1:
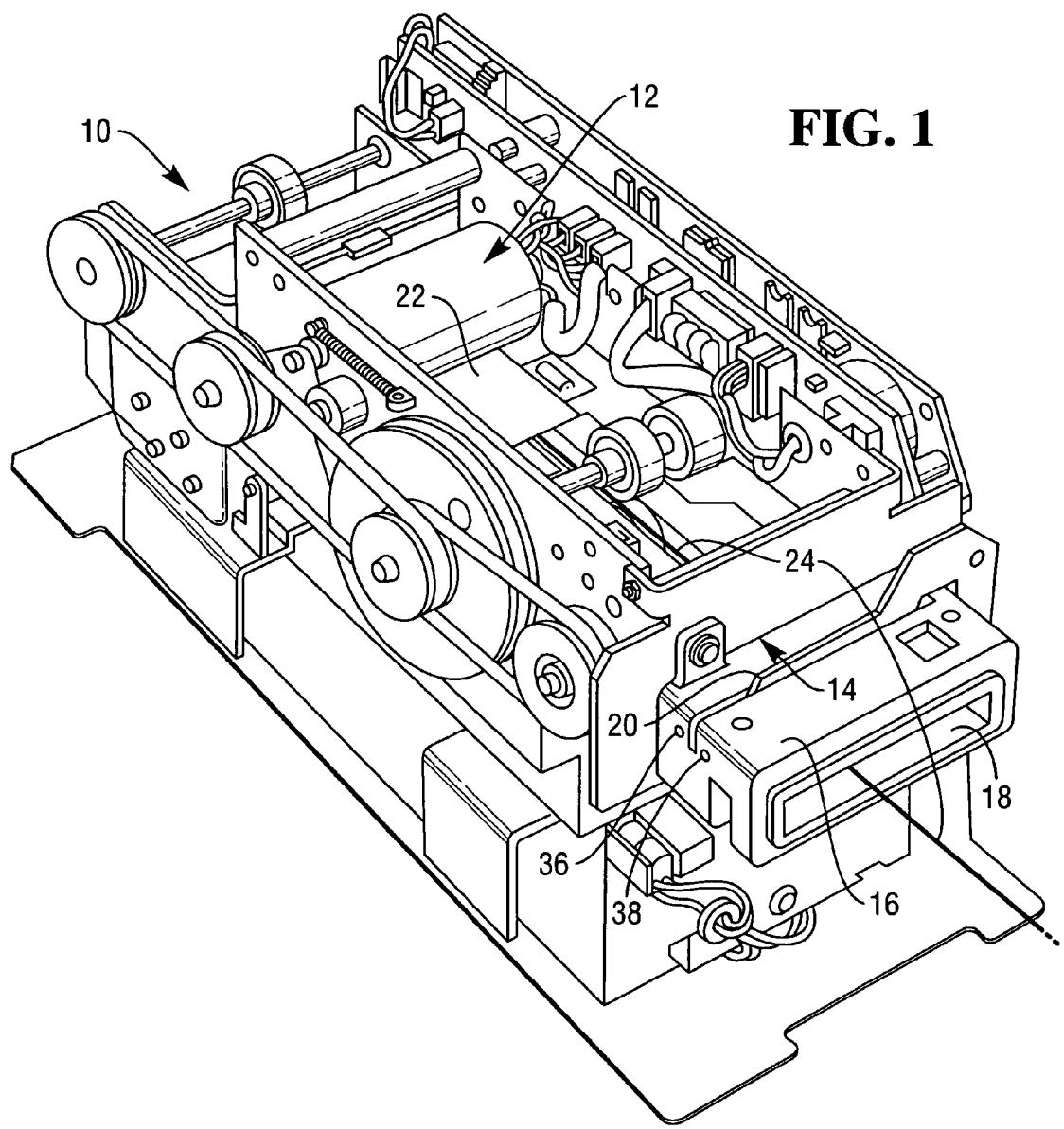
FIG. 1 is a perspective view of a known card reader with a card and a foreign object received therein.

In FIG. 1 a card reader 10, such as that currently employed in an ATM, comprises a data-reader section 12 to which a card having magnetically recorded data is delivered for the reading of the data therefrom as part of a user-verification procedure. The card reader has a mouth region 14 into which a card to be read is introduced by a user, and to which a card having been read is returned for retrieval by the user.

The mouth region 14 includes a throat portion 16 which presents a slot 18 of dimensions somewhat similar to the transverse cross section of the card and through which the card is delivered into the card reader 10 for subsequent delivery to the data reader region 12.

In order to prevent unwanted foreign bodies being introduced into the card reader via the slot 18, the throat portion 16 commonly employs a shutter arrangement 20 movable between first and second positions. In the first position the throat 16 defines an open passage for allowing delivery of a card introduced into the slot 18 into the card reader 10. In a second position, the shutter arrangement closes off the front of the slot 18 from the card reader 10.

Thus, the shutter arrangement 20 can serve to provide at least some limited form of fraud prevention.

However, the scope of fraud prevention is disadvantageously limited and FIG. 1 further illustrates one particular form of fraud to which the prior art arrangement is susceptible.

A card 22 having previously been introduced into the card reader 10 is illustrated at the location of the data reader region 12 and, as illustrated, a thread 24 secured to the card 22 by an adhesive or tape etc. extends back along the delivery path and out of the slot 18 for manipulation by a user attempting to execute a fraudulent activity. Although the shutter 20 is in its second, i.e. closed, position, the closed shutter is unable to prevent movement of the card within the reader which can be achieved by manipulation of the thread 24. The thread not only prevents retention of the card but also provides a means whereby the card can be moved relative to reading heads so as to generate a false reading.

Figure 2:
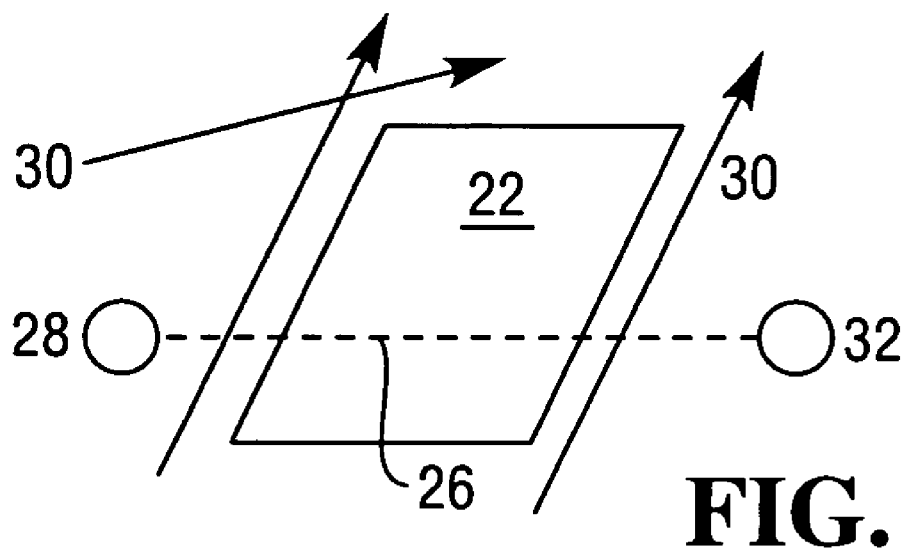
FIG. 2; is a schematic representation of the layout of the transport path and source of a card reader in accordance with one embodiment of the present invention FIG. 3; is a schematic representation of the layout of the transport path and source of a card reader in accordance with another embodiment of the present invention.
Figure 3:
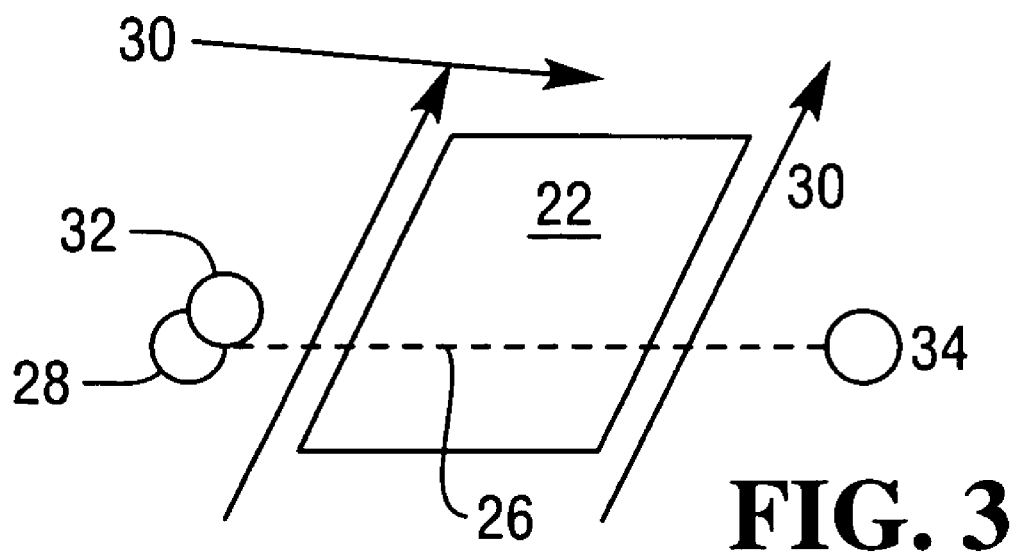

The light beam 26 illustrated in FIG. 2 traverses the desired zone as a result of an emitter 28 placed at one side of the card path 30 and a corresponding sensor 32 placed at the other. However, other configurations are possible, and optical means such as mirrors 34, prisms or fibre optics may be employed such that the active optical elements 28, 32 need not be in close proximity to the zone of interest. FIG. 3 illustrates one arrangement in which the emitter 28 and sensor 32 are placed on one side of the transport path 30 and a mirror 34 is placed on the other side of the path so as to reflect the beam 26 to the sensor 32.

In addition other frequencies of light may be utilized, some of which, being visible, may act as a deterrent to the would-be criminal.

Invariably, card readers employ shutters 20 (FIG. 1) to prevent debris being inserted into the reader transport. There is, therefore, a need to decide whether the light beam should project across the front or rear of the reader shutter 20 (or both front and rear).

FIG. 1 shows the end elevation of reader throat moldings 16 in which channels 36 and 38 have been inserted to locate optical fibres. In this way a beam can be projected in front of, and/or behind the shutter 16.

Whilst one beam affords the system considerable protection against attack, a more sophisticated embodiment utilizes two beams, one either side of the shutter. These beams are arranged either to work independently, or they may be the same beam "folded back upon itself" by optical means, or may be derived from a single beam by use of bifurcated optical fibre(s) (not shown).

In a further embodiment the integrity of these beams is enhanced by employing an encoding system (a "unique signature") to each beam in order to prevent criminals from introducing "alien" beams to overcome the security system, or to prevent cross-talk between the two beams of a dual-beam system.

The system works by detecting the small amount of beam attenuation resultant from the introduction of a filament (the Lebanese Loop) into the beam system. It should be noted, however, that normal action of the card reader shutter & the passage of cards themselves is detected by the system described above. Status information pertaining to the activity/state of the reader into an intelligent is therefore fed either to the reader controller 56 or to the ATM control processor 50 (FIG. 5) to ensure that false alarms are not raised due to the normal functioning of the card reader. The processor may incorporate a control system which is implemented in either hardware or software.

Figure 4:
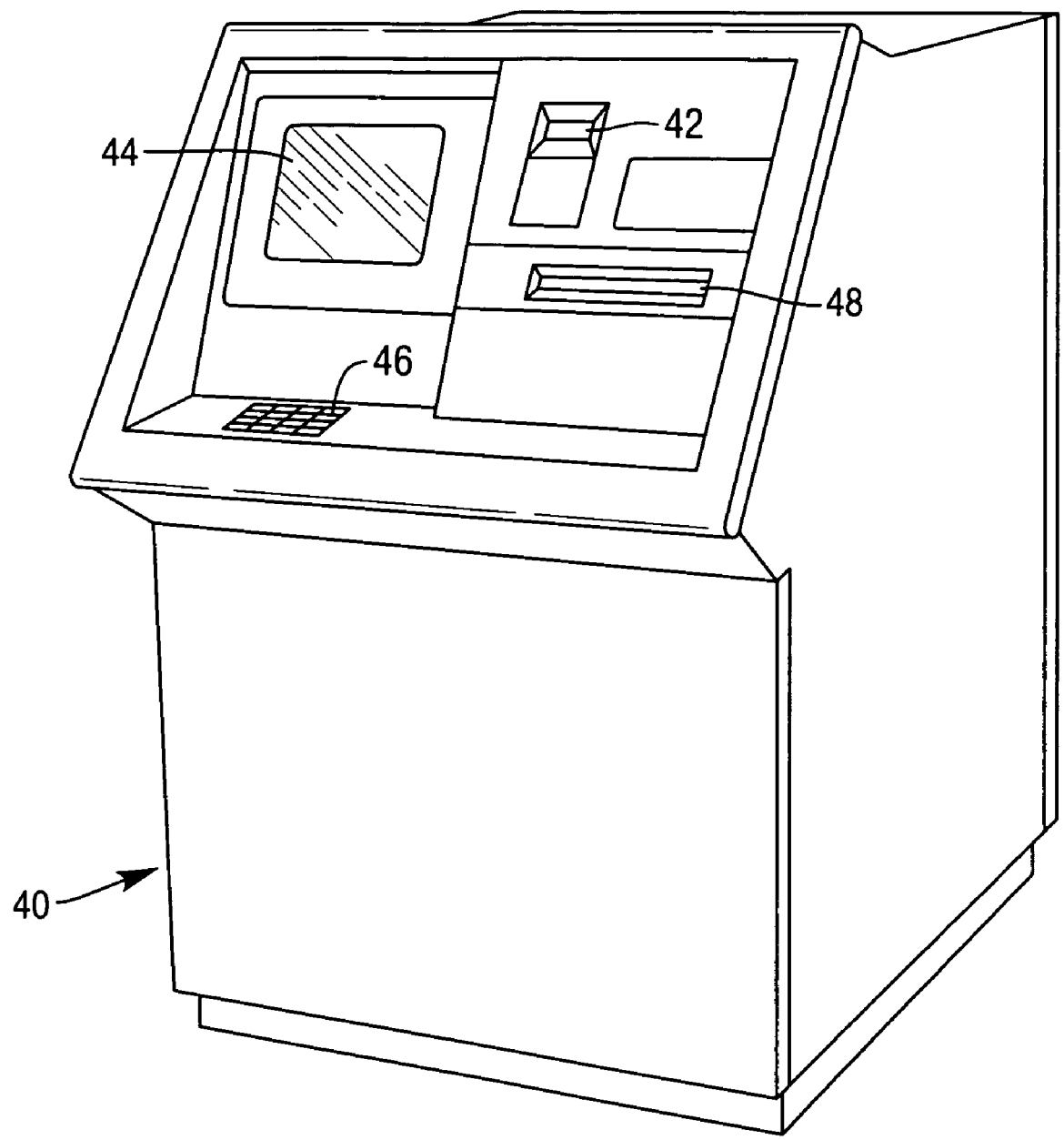
FIG. 4 is a perspective view of an ATM incorporating a card reader embodying the present invention.

FIG. 4 shows an automated teller machine 40 having a magnetic card input slot 42, a screen display 44, a keypad 46, and a cash delivery slot 48 and which is advantageously arranged for use in combination with a card reader according to the present invention.

Figure 5:
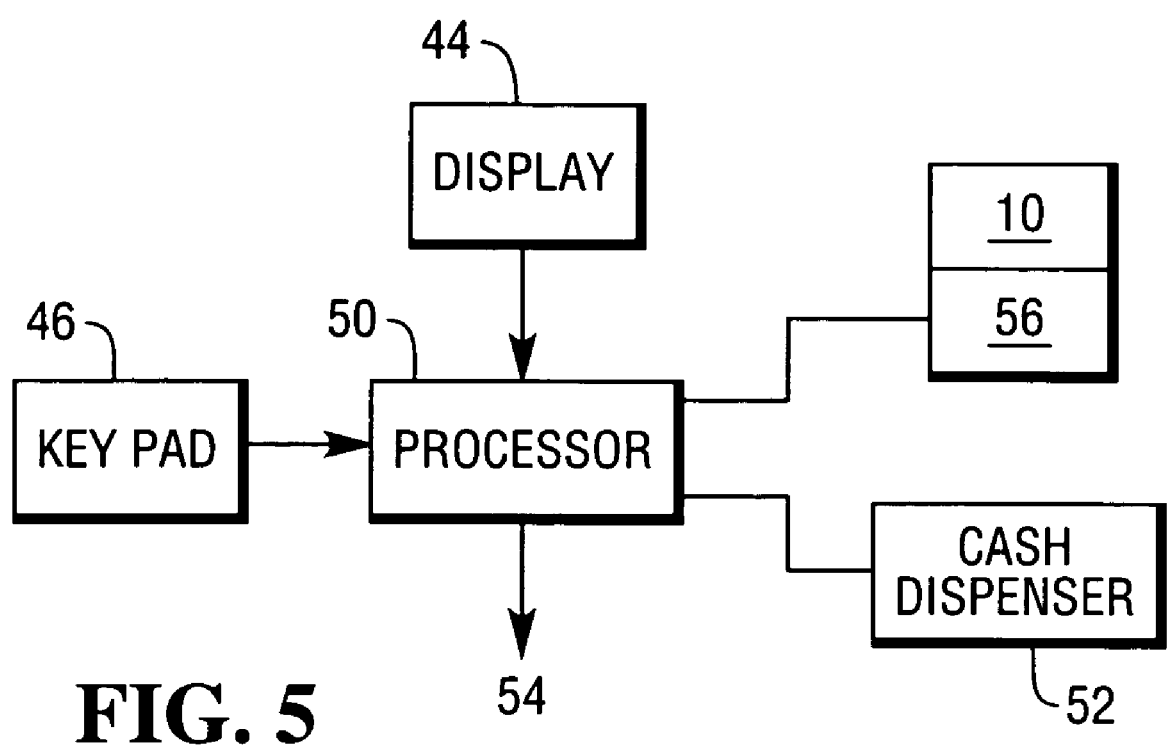
FIG. 5 is a block diagram illustrating a control system for the ATM of FIG. 4.

The control system for the automated teller machine 44 is illustrated as a block diagram in FIG. 5 in which a processor 50 is connected to receive an input from the keypad 46 in order to control the display 44 and also to control a cash counting and delivery system 52 connected to the cash delivery slot 48. A card reader 10 according to the invention is also connected to the processor 50 which, in turn, is connected via connection 54 to the central authorization system of the financial institution operating the automated teller machine 40.

As will be appreciated from the aforementioned FIGS. 2-5, should a user of the automated teller machine attempt a fraud by manipulating movement of the card within the card reader by means of a thread extending along the delivery path and out through the throat region, the detector arrangement will advantageously serve to identify the presence of such a thin foreign object. An appropriate response signal can advantageously then be generated which can serve to not only prevent any further attempted fraudulent use of the self-service terminal but may also be used to initiate some form of alarm generation procedure.

The invention is not restricted to the details of the aforementioned embodiment. For example, the card reader can be employed in any appropriate self-service terminal employing some form of data carrier to be inserted into the terminal.

What is claimed is:

1. A card reader comprising a card receiving means for receiving a card having stored data to be read and card reading means for reading the stored data, the reader being arranged to deliver the card received at the card receiving means to the card reading means via a delivery path, the delivery path being arranged to maintain the card in a predetermined plane during transportation, a signal source for providing an output signal which is projected across the delivery path in the plane which the card passes when in use, and a detector arranged to receive the output signal and to detect the presence of an object in the delivery path in response to the object interfering with the output signal, wherein optical fibres are arranged to bring the output signal from the signal source to one side of the delivery path for projection across the delivery path.

2. A card reader according to claim 1, wherein the output signal from the signal source comprises first and second beams arranged to detect the presence of the object at two distinct points along the delivery path.

3. A card reader according to claim 2, wherein the first beam is located within the interior of the reader and the second beam is located outside of the interior of the reader.

4. A card reader according to claim 3, wherein both the first and second beams are located adjacent a shutter.

5. A card reader according to claim 2, further comprising an encoding system arranged to provide the beam or beams with a unique signature.

6. A card reader according to claim 1, wherein the signal source and the detector are located on the same side of the delivery path, and a reflector is employed to reflect the signal from the signal source for receipt by the detector.

7. A card reader according to claim 1, wherein the signal source and the detector comprise appropriately matched electro-optic devices.

8. A card reader comprising a card receiving means for receiving a card having stored data to be read and card reading means for reading the stored data, the reader being arranged to deliver the card received at the card receiving means to the card reading means via a delivery path, the delivery path being arranged to maintain the card in a predetermined plane during transportation, a signal source for providing an output signal which is projected across the delivery path in the plane which the card passes when in use, and a detector arranged to receive the output signal and to detect the presence of an object in the delivery path in response to the object interfering with the output signal, wherein optical fibres are arranged at a side of the delivery path to receive the output signal having crossed the delivery path and to transmit the received output signal to the detector.

9. A card reader according to claim 8, wherein the output signal from the signal source comprises first and second beams arranged to detect the presence of the object at two distinct points along the delivery path.

10. A card reader according to claim 9, wherein the first beam is located within the interior of the reader and the second beam is located outside of the interior of the reader.

11. A card reader according to claim 10, wherein both the first and second beams are located adjacent a shutter.

12. A card reader according to claim 9, further comprising an encoding system arranged to provide the beam or beams with a unique signature.

13. A card reader according to claim 8, wherein the signal source and the detector are located on the same side of the delivery path, and a reflector is employed to reflect the signal from the signal source for receipt by the detector.

14. A card reader according to claim 8, wherein the signal source and the detector comprise appropriately matched electro-optic devices.

* * * * *